US010210861B1

(12) United States Patent
Arel et al.

(10) Patent No.: US 10,210,861 B1
(45) Date of Patent: Feb. 19, 2019

(54) CONVERSATIONAL AGENT PIPELINE TRAINED ON SYNTHETIC DATA

(71) Applicant: Apprente, Inc., Mountain View, CA (US)

(72) Inventors: Itamar Arel, Los Altos, CA (US); Joshua Benjamin Looks, Palo Alto, CA (US); Ali Ziaei, Redwood City, CA (US); Michael Lefkowitz, San Francisco, CA (US)

(73) Assignee: Apprente, Inc., Mountain View, CA (US)

( * ) Notice: Subject to any disclaimer, the term of this patent is extended or adjusted under 35 U.S.C. 154(b) by 0 days.

(21) Appl. No.: 16/146,924

(22) Filed: Sep. 28, 2018

(51) Int. Cl.
*G06F 17/28* (2006.01)
*G06N 99/00* (2010.01)
*G10L 15/02* (2006.01)
*G10L 15/06* (2013.01)
*G10L 15/16* (2006.01)
*G10L 15/18* (2013.01)
*G10L 15/193* (2013.01)

(52) U.S. Cl.
CPC ........ *G10L 15/063* (2013.01); *G06F 17/2881* (2013.01); *G06N 99/005* (2013.01); *G10L 15/02* (2013.01); *G10L 15/1815* (2013.01); *G10L 15/193* (2013.01); *G10L 15/16* (2013.01); *G10L 2015/025* (2013.01)

(58) Field of Classification Search
CPC ... G06F 17/2881; G10L 13/027; G10L 15/01; G10L 15/063
See application file for complete search history.

(56) References Cited

U.S. PATENT DOCUMENTS 6,622,121 B1 * 9/2003 Crepy .................... G10L 15/01
    704/243
7,133,827 B1 * 11/2006 Gillick .................. G10L 15/063
    704/243

(Continued)

OTHER PUBLICATIONS

Jung, Sangkeun, et al. "Data-driven user simulation for automated evaluation of spoken dialog systems." Computer Speech & Language 23.4 (2009): 479-509. (Year: 2009).*

(Continued)

*Primary Examiner* — Brian L Albertalli
(74) *Attorney, Agent, or Firm* — Lowenstein Sandler LLP (57) ABSTRACT

In one embodiment synthetic training data items are generated, each comprising a) a textual representation of a synthetic sentence and b) one or more transcodes of the synthetic sentence comprising one or more actions and one or more entities associated with the one or more actions. For each synthetic training data item, the textual representation of the synthetic sentence is converted into a sequence of phonemes that represent the synthetic sentence. A first machine learning model is then trained as a transcoder that determines transcodes comprising actions and associated entities from sequences of phonemes, wherein the training is performed using a first training dataset comprising the plurality of synthetic training data items that comprise a) sequences phonemes that represent synthetic sentences and b) transcodes of the synthetic sentences. The transcoder may be used in a conversational agent.

20 Claims, 8 Drawing Sheets

(56) References Cited

U.S. PATENT DOCUMENTS

| | | | | |
|---|---|---|---|---|
| 7,684,988 | B2* | 3/2010 | Barquilla | G10L 13/08 704/243 |
| 10,134,388 | B1* | 11/2018 | Lilly | G10L 15/063 |
| 2006/0190252 | A1* | 8/2006 | Starkie | G10L 15/01 704/240 |
| 2006/0206332 | A1* | 9/2006 | Paek | G10L 15/063 704/257 |
| 2009/0306995 | A1* | 12/2009 | Weng | G06Q 10/103 705/301 |
| 2010/0063823 | A1* | 3/2010 | Wu | G10L 15/18 704/275 |
| 2013/0018649 | A1* | 1/2013 | Deshmukh | G10L 15/26 704/9 |
| 2015/0261745 | A1* | 9/2015 | Song | G06F 17/2881 704/9 |
| 2017/0018270 | A1* | 1/2017 | Min | G10L 15/063 |
| 2018/0143967 | A1* | 5/2018 | Anbazhagan | G06F 8/30 |
| 2018/0247640 | A1* | 8/2018 | Yassa | G10L 15/063 |

OTHER PUBLICATIONS

Pietquin, Olivier, and Thierry Dutoit. "A probabilistic framework for dialog simulation and optimal strategy learning." IEEE Transactions on Audio, Speech, and Language Processing 14.2 (2006): 589-599. (Year: 2006).*

Wang, Chao, Stephanie Seneff, and Grace Chung. "Language model data filtering via user simulation and dialogue resynthesis." Ninth European Conference on Speech Communication and Technology. 2005. (Year: 2005).*

Chung, Grace, Stephanie Seneff, and Chao Wang. "Automatic induction of language model data for a spoken dialogue system." 6th SIGdial Workshop on Discourse and Dialogue. 2005. (Year: 2005).*

* cited by examiner

CONVERSATIONAL AGENT PIPELINE TRAINED ON SYNTHETIC DATA

TECHNICAL FIELD

This disclosure relates to the field of artificial intelligence and machine learning, and in particular to a conversational agent pipeline that is trained for use in a constrained domain using synthetic data.

BACKGROUND

A conversational agent is a software program that interprets and responds to statements made by users in ordinary natural language. Examples of conversational agents include Microsoft® Cortana®, Apple® Siri®, Amazon® Alexa® and Google® Assistant®. A traditional conversational agent receives an audio waveform, performs feature extraction to convert the the audio waveform into sequences of acoustic features, and inputs the sequences of acoustic features into an automatic speech recognition (ASR) system that includes an acoustical model (AM) and a language model (LM). The AM determines the likelihood of the mapping from these acoustic features to various hypothesized sequences of phonemes, while the LM determines the a priori likelihood of sequences of words. A decoder uses these two models together with a pronunciation lexicon to select a maximally likely sequence of words given the input (e.g., acts as a speech transcription engine). The sequences of text output by the ASR are the input into a natural language understanding (NLU) system, which determines a speaker's intent based on the text output by the ASR. The speaker's determined intent is then input into a dialog management system that determines one or more actions to perform to satisfy the determined intent.

Traditional conversational agents are designed to work in an open-ended domain in which the conversational agents receive inputs about a wide range of topics, determine a wide range of user intents based on the inputs, and produce a large range of outcomes based on the determined user intents. However, the ASR system of traditional conversational agents are often error prone and cause word level errors which are then propagated through the NLU system, which can ultimately cause the conversational agent to incorrectly determine speaker intent or fail to determine speaker intent. For example, acoustic distortions can make it very difficult to transcribe speaker utterances correctly. Accordingly, the accuracy of conversational agents degrades when there is noise (e.g., in real world conditions with background acoustic noise) or any other acoustic mismatch between training data and real world data (e.g., data used in testing and/or field application) that can degrade performance of the ASR. Such mismatches can be caused, for example, by variability in noise, reverb, speaker gender, age, accent, and so on. Additionally, people naturally use non-standard grammar when they speak in many situations, and make performance errors such as frequent stops, restarts, incomplete utterances, corrections, "ums", "ands", and so on that make it very challenging for the NLU to determine the correct speaker intent. These phenomena often cause conversational agents to incorrectly determine speaker intent or fail to determine speaker intent.

BRIEF DESCRIPTION OF THE DRAWINGS

The present disclosure will be understood more fully from the detailed description given below and from the accompanying drawings of various embodiments of the present disclosure, which, however, should not be taken to limit the present disclosure to the specific embodiments, but are for explanation and understanding only.

DETAILED DESCRIPTION

Embodiments of the present disclosure relate to a new conversational agent pipeline capable of accurately determining speaker intent within a restricted domain from utterances even with background noise, reverberation and non-standard grammar that may include frequent stops, restarts, incomplete utterances, corrections, "ums", "ands", and so on in the utterances. By operating in a constrained domain (e.g., a specific user interaction scenario such as fast food ordering, online ordering, in-store information kiosks, travel booking, call centers, etc.), the conversational agent pipeline can be trained to provide a more natural conversational experience within that restricted domain. For example, in the context of fast food drive throughs, a conversational agent may be trained to understand and respond accurately to every way that a customer might order off of a restaurant's menu. An example of a more natural conversational experience that may be achieved by the conversational agent pipeline in embodiments is an experience that avoids the traditional "activate agent with wake-word or button, say a single command or query, wait for a response, and repeat" flow. Instead, users are able to speak freely to the conversational agent as they would to another person, without needing to know any particular commands, features or characteristics of the conversational agent.

The conversational agent described in embodiments includes an acoustic model (AM), a transcoder, and a business logic system arranged in a pipeline. The acoustic model is trained to receive as an input an audio waveform that represents an utterance of a speaker and to output a sequence of phonemes (the basic building blocks of speech) that represent the utterance of the speaker. The sequences of phonemes may be represented by sequences of vectors that include phoneme probability distributions. The acoustic model may also optionally output sequences of non-phonemic or prosodic features along with the sequence of phonemes. Some examples of such features include pitch, volume, duration, and so on. The phonemes (e.g., which may include vectors of phoneme probability distributions) and/or non-phonemic or prosodic features output by the acoustic model may occur at regular and/or irregular intervals (e.g., every 10 ms).

The sequence of phonemes (e.g., which may include sequences of vectors representing phoneme probability distributions) and/or non-phonemic features output by the acoustic model is input into the transcoder, which is trained to receive sequences of phonemes and to output core inferences about intent (referred to herein as transcodes) based on the sequences of phonemes. The determined intent (transcodes) may include one or more requested actions (e.g., add an item to an order, cancel an order, remove an item from an order, modify an item from an order) and one or more entities (e.g., nouns) associated with the one or more actions (e.g., a hamburger, a pickle, a drink, a particular plane flight, and so on). Notably, the transcoder described in embodiments operates on sequences of phonemes rather than on text. In contrast, traditional NLUs operate on text to determine intent. By operating on sequences of phonemes rather than text, the transcoder in embodiments is capable of accurately determining intent even when the original audio includes acoustic noise, reverberation, distortions, and non-standard grammar such as stops, restarts, incomplete utterances, corrections, "ums", "ands", and so on in an utterance. The transcoder described herein is able to accurately determine intent even in instances, for example, where one or more words and/or syllables from the original utterance were missing and/or a car honked during the original utterance. The transcoder in embodiments filters out inconsequential parts of an input sequence of phonemes and focuses on the salient part of a conversation that reflects intent. Such abilities are provided in some embodiments at least in part because the transcoder does not operate on a text hypothesis (as generated by an ASR), which is how traditional NLUs function. In embodiments, the AM generates one or more sequences of phonemes, which get mapped to a decision by the transcoder without ever generating or using text. In some embodiments, the conversational agent pipeline that excludes an ASR and traditional NLU can function without using text at least in part because it is operating in a restricted domain.

In embodiments, the transcodes output by the transcoder are input into a business logic system or layer. The business logic system may include one or more rules that check the transcodes for inconsistencies and/or errors (e.g., such as a diet coke ordered with mayonnaise, or a multiple identical articles ordered in a short time frame). The business logic resolves any identified inconsistencies and/or errors, and then performs one or more operations to satisfy the actions in the transcodes, such as adding items to an order.

In order to train the conversational agent, the acoustic model may be trained using a first training dataset and the transcoder may be trained using a second training dataset in embodiments. The first training dataset may comprise a plurality of data items, wherein each data item of the plurality of data items comprises audio data (e.g., an audio waveform) for an utterance and a textual representation of the utterance. The first training dataset may be real audio data, which may not be associated with the restricted domain for which the conversational agent will be used. To train the AM, for each data item the textual representation of the utterance may be converted into a sequence of phonemes that represent the utterance of that data item. The AM may then be trained to generate sequences of phonemes from audio data of utterances using the training dataset comprising a plurality of modified data items that comprise a) audio data for utterances and b) sequences of phonemes that represent the utterances. The audio data may be the inputs into the AM during training, and the sequences of phonemes may be labels or targets associated with the data items.

There may be limited data items (or no data items) within the restricted domain that are suitable for training the transcoder. Accordingly, in some embodiments a conversational simulator generates synthetic training data items for training the transcoder. The synthetic training data items may comprise a) a textual representation of a synthetic sentence and b) a transcoding of the synthetic sentence comprising one or more actions and one or more entities associated with the one or more actions included in the synthetic sentence. The synthetic sentence and associated transcodes may be within a restricted domain within which the conversational agent will function. For each synthetic training data item, a grapheme to phoneme converter may convert the textual representation of the synthetic sentence into a sequence of phonemes that represent the synthetic sentence. Accordingly, the data items in the second training dataset may include a) sequences phonemes that represent synthetic sentences and b) sequences of transcodes of the synthetic sentences. The sequences of phonemes may be used as the inputs into the transcoder during training, and the transcodes may be labels or targets associated with the sequences of phonemes. The transcoder may therefore be trained on synthetic training data generated using domain specific information and/or stochastic grammar rules. This enables a large range of possible utterances to be generated, potentially covering the entire range of possibilities within the restricted domain. As a result, the transcoder may be robust, and may be trained to accurately determine speaker intent within the restricted domain even when the original audio includes acoustic noise, reverberations, distortions, and non-standard grammar such as stops, restarts, incomplete utterances, corrections, "ums", "ands", and so on in an utterance.

As discussed above, embodiments provide a conversational agent pipeline that is more accurate than traditional conversational agents that use ASR and traditional NLU when used in a restricted domain. Additionally, the conversational agent pipeline described in embodiments includes fewer subsystems than traditional conversational agents, thus reducing a total amount of computing resources, memory resources and/or network bandwidth that is used to process input speech, determine intent from the speech, and perform actions on the determined intent.

Figure 1:
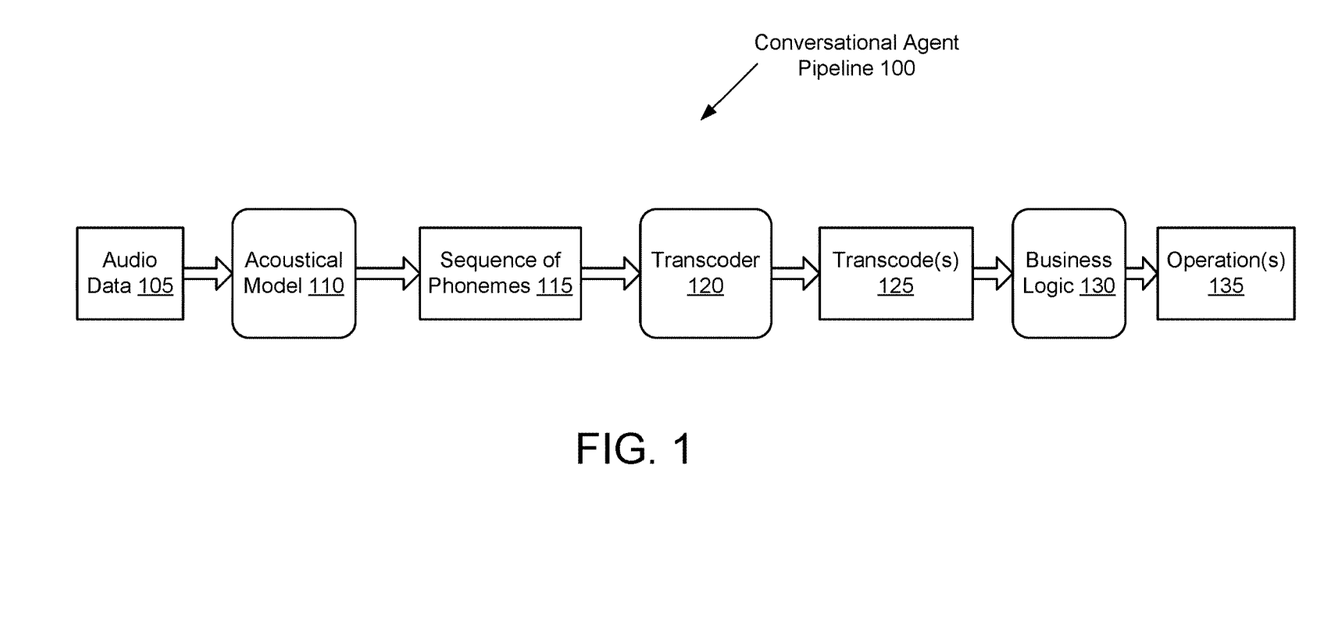
FIG. 1 is a block diagram illustrating a conversational agent pipeline, in accordance with embodiments of the present disclosure.

Referring now to the figures, FIG. 1 is a block diagram illustrating a conversational agent pipeline 100, in accordance with embodiments of the present disclosure. The conversational agent pipeline 100 comprises an acoustical model (AM) 110, a transcoder 120 and a business logic 130 (also referred to as a business logic system or business logic layer).

The acoustical model 110 may be a machine learning model (or arrangement of multiple machine learning models) that has been trained to generate sequences of phonemes 115 from audio data 105 of utterances (e.g., from one or more speakers). The transcoder 120 may be another machine learning model (or arrangement of multiple machine learning models) that determines speaker intent based on sequences of phonemes (e.g., sequence of phonemes 115). The intent may be represented as one or more transcodes 125 comprising actions and associated entities. The transcodes 125 may be input into the business logic 130, which may determine one or more operations 135 to perform to satisfy the intent represented by the one or more transcodes 125 (e.g., to perform one or more actions identified in the transcodes 125).

As noted above, the conversational agent 100 in some embodiments does not include an ASR or other language model that determines the probability of specific sequences of words. Instead, the acoustical model 110 outputs sequences of phonemes rather than sequences of words, and the transcoder 120 determines intent based on sequences of phonemes rather than based on sequences of words. In some embodiments, the AM includes a language model. However, in such embodiments the AM still outputs phonemes rather than text. Using phonemes rather than words has multiple benefits. First, by using phonemes, multiple subsystems may be eliminated, reducing an amount of compute resources, memory resources and/or network bandwidth resources that are used by the conversational agent pipeline 100. Additionally, by using phoneme level information rather than word level information, the output domain of the acoustical model 110 is reduced from thousands of possibilities (e.g., around 180,000 words for the English language) to less than 100 possibilities (e.g., 39 phonemes in the Carnegie Mellon University Pronouncing Dictionary). Accordingly, at the phoneme level 39 different phonemes can be used to represent all of the words in the English dictionary. Additionally, the phonemes can also cover any utterances, including those with out-of-lexicon words and phrases which may not be included in any language dictionary. Standard ASRs and NLUs that operate at the word level may fail when words not in a dictionary are used, precisely because they must map all or most of the input to text. However, the conversational agent pipeline 100 is able to accurately determine speaker intent even when such out of lexicon words are used in utterances.

The acoustical model 110 may output phonemes and/or non-phonemic or prosodic features at regular or irregular intervals. For example, the acoustic model 110 may output sequences of phonemes (and optionally non-phonemic or prosodic features) at 10 ms intervals, where a distinct phoneme (or vector of phoneme probabilities) is output at each 10 ms interval. The output phoneme for a time interval may be a single phoneme that had the highest probability of being correct. In one embodiment, the output phoneme is a sparse vector that includes a separate element for each phoneme. The output phoneme may have a 1 value associated with the winning phoneme with the highest probability and 0s values associated with the other phonemes. Alternatively, the output phoneme may be a vector that may include probabilities for some or all of the possible phonemes. For example, an output of the acoustical model 110 may be a sequence of vectors (e.g., 39 element vectors if CMU phonemes are used with no non-phonemic features), where each vector includes a probability value for each of the elements (e.g., 10% probability of a first phoneme, 90% probability of a second vector, and 0% probability of remaining phonemes; [0.1, 0.9, 0, . . . , 0]). In one embodiment, the sequence of phonemes is represented as a lattice that includes a series of alignment values (e.g., 0, 1, 2, 3, etc.) that each represent a time step, where each alignment value is associated with a sparse vector with a value of 1 for a winning phoneme class and values of 0 for the remaining phoneme classes. In one embodiment the sequence of phonemes is represented as a lattice that includes a series of alignment values (e.g., 0, 1, 2, 3, etc.) that each represent a time step (e.g., 0 ms, 10 ms, 20 ms, etc.), where each alignment value is associated with a phonetic posteriorgram.

A phonetic posteriorgram is defined by a probability vector representing the posterior probabilities of a set of predefined phonetic classes (e.g., the 39 CMU phoneme classes) for speech frames (e.g., from a window of speech frames).

In one embodiment, the acoustical model 110 is a hidden Markov model (HMM) that maps audio data inputs (e.g., acoustic features such as MFCCs extracted from audio way) into sequences of phonemes, such as those described above. An HMM is a statistical Markov model in which the system being modeled is assumed to be a Markov process with hidden states. A Markov model is a stochastic model used to model randomly changing systems. A hidden Markov model models the state of a system with a random variable that changes over time, where the state is only partially observable. In other words, observations are related to the state of the system, but they are typically insufficient to precisely determine the state of the system. For example, for the HMM, observed data is the embedding (e.g., MFCCs and/or other acoustic features) of a speech audio waveform and the hidden state is the spoken phonemes.

In one embodiment, the acoustical model 110 is a trained neural network, such as a recurrent neural network (RNN). An RNN is a type of neural network that includes a memory to enable the neural network to capture temporal dependencies. An RNN is able to learn input-output mappings that depend on both a current input and past inputs. RNNs may be trained using a training dataset to generate a fixed number of outputs (e.g., to classify time varying data such as audio data as belonging to a fixed number of classes such as phoneme classes). One type of RNN that may be used is a long short term memory (LSTM) neural network. In one embodiment, a six layer LSTM is used.

In one embodiment, the acoustical model 110 is a combination of a neural network (e.g., an RNN) and a hidden markov model. In one embodiment, the acoustic model has two main parts, including a Hidden Markov Model (HMM) and a Long Short Term Memory (LSTM) inside the HMM which models feature statistics. Alternatively, the AM may be based on a combination of a Gaussian Mixture Model (GMM) and an HMM (e.g., a GMM-HMM). In one embodiment, the acoustical model 110 is an implementation based on the Kaldi® framework to output phonemes (and optionally non-phonemic or prosodic features) rather than text. Other machine learning models may also be used for the acoustical model 110.

The transcoder 120 is a machine learning model trained to generate transcodes 125 from sequences of phonemes 115. The transcoder 120 may be or include a neural network. In one embodiment, the transcoder 120 is a recurrent neural network. In one embodiment, the transcoder 120 is an LSTM that uses a connectionist temporal classification (CTC) loss function.

The transcoder 120 receives a sequence of phonemes 115 as an input and outputs one or more transcodes 125, where the transcodes 125 represent an inference of intent associated with the utterance captured in the original audio data 105. The set of possible transcodes that may be output by the transcoder 120 may depend on the restricted domain for which the conversational agent pipeline 100 is trained. The same acoustical model 110 may be used across different conversational agent pipelines 100 in different domains, but the transcoders 120 may be used for a particular domain in embodiments. In the example of fast food ordering, the possible actions for the transcodes may include add entity to order, remove entity from order and modify entity. The possible entities that may be added to the order may be based on a menu associated with a fast food restaurant. Each entry may be associated with additional entities, such as size entities, component/ingredient entities, and so on. For example, a hamburger entity may be associated with sub-entities of meat, ketchup, mustard, mayonnaise, onion, lettuce and pickles, and any of these sub-entities may be added, removed or modified as well as the hamburger entity.

In an example, the audio data 105 may be a waveform of an utterance that states, "can I please have a hamburger with no pickles, oh, and please add extra onions." The acoustical model 110 may receive acoustic features (e.g., an embedding including MFCCs) for such audio data 105 as an input, and may output a sequence of phonemes 115 as follows: "k ah n ay p l iy z hh ae v ah hh ae m b er g er w ih th n ow p ih k ah l z ow ae n d p l iy z ae d eh k s t er ah n y ah n z." This sequence of phonemes 115 may then be input into the transcoder 120, which may output one or more transcodes 125 that represent the intent of the original utterance. For example, the transcoder 120 may output a sequence of transcodes as follows: {[order], [hamburger], [remove], [pickles], [add], [onions]}.

The transcodes 125 output by the transcoder 120 are input into the business logic 130. The business logic 130 may make final decisions based on the transcodes 125. The business logic 130 may perform one or more operations or actions 135 to satisfy the intent associated with the transcodes 125. In the above example, the business logic 130 may add a hamburger to an order, and may specify that the hamburger is to have no pickles and extra onions in the order. In some embodiments, the business logic 130 may include a rules engine that applies one or more rules to the transcodes. The business logic 130 may then perform one or more operations based on whether or not the rule or rules are satisfied. In one embodiment, the business logic 130 includes one or more rules that determine whether the transcodes 125 make sense and/or whether multiple identical entities have been ordered consecutively. In one embodiment, the business logic 130 includes one or more rules for producing follow-up questions to output to a speaker if the transcodes indicate an impossible or ambiguous intent.

Figure 2A:
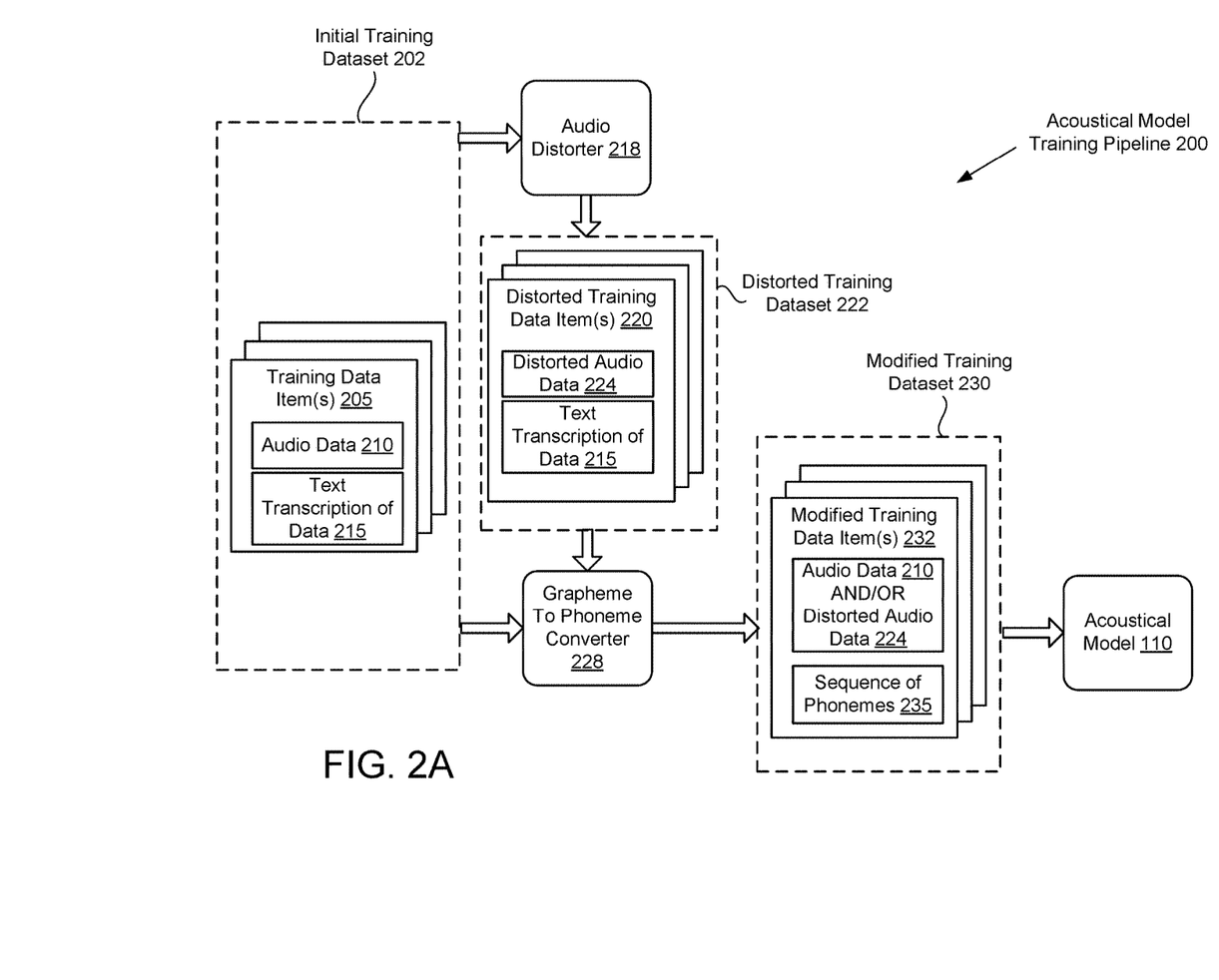
FIG. 2A is a block diagram illustrating an acoustical model training pipeline, in accordance with embodiments of the present disclosure.

FIG. 2A is a block diagram illustrating an acoustical model training pipeline 200, in accordance with embodiments of the present disclosure. The acoustical model training pipeline 200 includes an acoustical model 110 that outputs sequences of phonemes based on inputs of acoustic features from audio data. In order for the acoustical model to be trained to output sequences of phonemes (e.g., sequences of vectors representing phoneme probabilities), a training dataset (modified training dataset 230) should include data items that include both audio data and sequences of phonemes. However, available datasets (e.g., initial training dataset 202) for training speech recognition systems (such as the Common Voice and Libre Speech datasets) include audio data and associated text transcriptions of the audio data. For example, training data items 205 in the initial training dataset 202 each include audio data 210 and an associated text transcription 215 of the audio data.

In embodiments, the text transcriptions 215 of the training data items 205 in the initial training dataset 202 are input into a grapheme to phoneme converter 228 that converts the text transcriptions 215 into sequences of phonemes 235. In one embodiment, the grapheme to phoneme converter 228 is a machine learning model that has been trained to convert text (graphemes) into phonemes. In one embodiment, the grapheme to phoneme converter 228 is a neural network. For example, the grapheme to phoneme converter 228 may be an RNN or a hidden Markov model. In one embodiment, the grapheme to phoneme converter 228 includes a lookup table that maps text into phonemes. For example, the lookup table may include an English language dictionary, where each word in the dictionary includes the phoneme sequence associated with that word. Accordingly, the grapheme to phoneme converter 228 may find a word from input text on the table, determine the sequence of phonemes for that word of text, and output the determined sequence of phonemes.

The initial training dataset 202 may include data that lacks background noise, vibrations, reverberations, distortions, and so on. However, audio data that is received by the conversational agent 100 during use may include such background noise, distortions, vibrations, reverberations, and so on. Accordingly, in order to train the acoustical model 110 to accurately determine phonemes even with such distortions and other noise and reverberation, training data items 205 from the initial training dataset 202 may be input into an audio distorter 218. Audio distorter 218 may augment the audio data 210 of the training data items 205 by adding background music, background noise, vibrations, and so on to the audio data 210, resulting in a distorted or augmented training dataset 222 that includes distorted/augmented training data items 220 with distorted audio data 224.

An augmented training dataset 230 may include augmented training data items 232 that include acoustic features/embeddings of original audio data 210 with associated sequences of phonemes 235 and/or acoustic features/embeddings of augmented/distorted audio data 224 with associated sequences of phonemes 235, where the sequences of phonemes 235 represent targets. The modified or augmented training dataset 230 may be used to train the acoustical model 110. For example, for each augmented training data item 232, the embeddings of the audio data 210 and/or distorted audio data 224 may be input into the acoustical model 110 for training of the acoustical model 110.

Figure 2B:
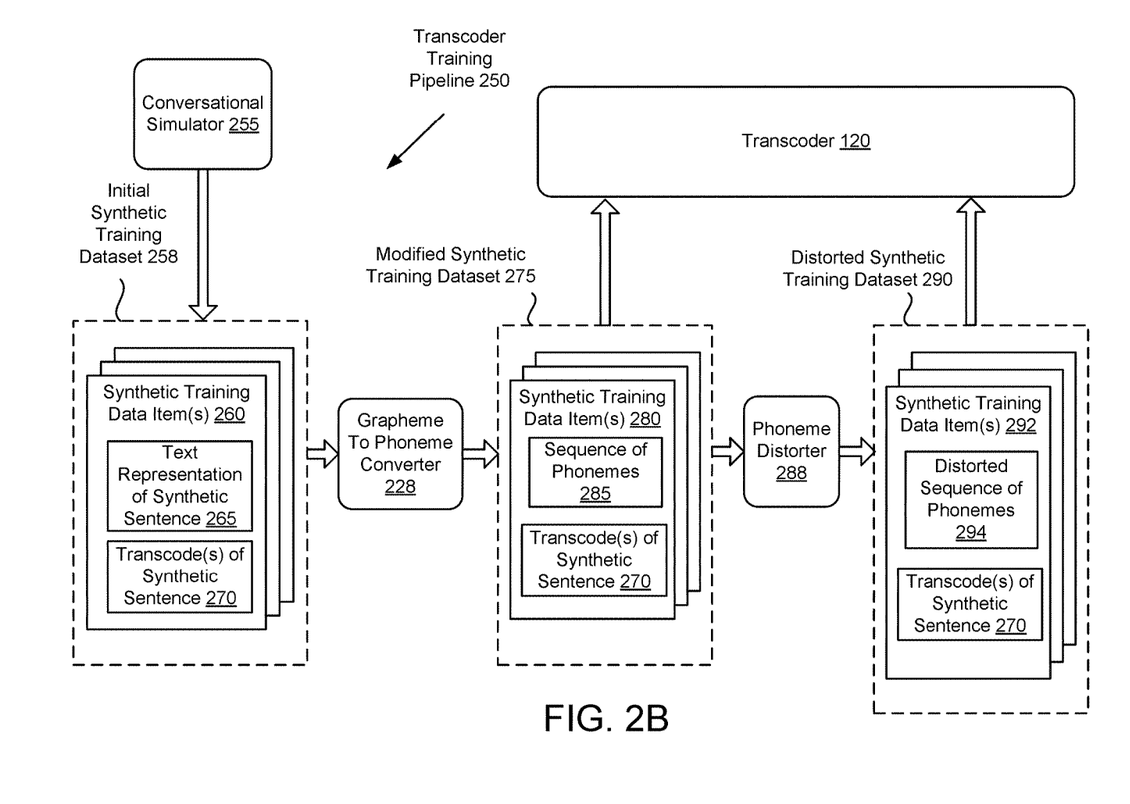
FIG. 2B is a block diagram illustrating a transcoder training pipeline, in accordance with embodiments of the present disclosure.

FIG. 2B is a block diagram illustrating a transcoder training pipeline 250, in accordance with embodiments of the present disclosure. The transcoder training pipeline 250 includes a machine learning model that is to be trained as a transcoder 120 that outputs one or more transcodes (e.g., sequences of transcodes) based on inputs of sequences of phonemes. In order for the transcoder 120 to be trained to output transcodes based on sequences of phonemes, a training dataset should include training data items that include both sequences of phonemes and transcodes, where the transcodes represent targets. However, there is generally insufficient audio data available within a particular domain to train the transcoder 120 to accurately generate transcodes for such a domain. Accordingly, in embodiments the transcoder training pipeline 250 includes a conversational simulator 255.

Conversational simulator 255 is a natural language generator that may be configured to generate synthetic sentences and associated descriptors (e.g., transcodes) that apply to a particular domain (e.g., fast food ordering, web travel booking, in-store kiosk, etc.). Each set of transcodes may include one or more actions and one or more associated entities. For example, in the domain of web travel bookings, actions may include book a trip, cancel a trip, and modify a trip, and associated entities may include flights, times, locations, and so on. The conversational simulator 255 may include a collection of grammar rules that are applied along with randomness (e.g., using a random number generator or pseudorandom number generator) to generate an initial synthetic training dataset 258 that includes a large corpus of synthetic training data items 260.

In one embodiment, the conversational simulator 255 includes a neural network or other machine learning model trained to generate plausible sentences within a restricted domain. In one embodiment, the conversational simulator 255 is a generative adversarial network (GAN) that generates synthetic training data items 260.

In one embodiment, the conversational simulator 255 includes a context-free grammar. A context-free grammar is a set of recursive rewriting rules used to generate patterns of strings. Each rule may cause an expansion from an initial object into one or more output objects. A context free grammar may include a set of terminal symbols, which are the characters of an alphabet that appear in the strings generated by the context-free grammar. The context free grammar may have a small set of rules that can be used to generate a very large number unique sentences. Each unique sentence may be generated by building a tree using one or more of the rules of the context-free grammar. The leaves of the tree may contain terminals that may form the string or sentence (e.g., sequence of words). In one embodiment, the context-free grammar has rules that generate text as well as rules that generate transcodes. Additionally, or alternatively, a single rule may generate both text (e.g., a string) as well as an associated transcode. Accordingly, the leaves of a tree formed using the context-free grammar may include a pair of sequences that include a sequence of text (the sentence) as well as a sequence of transcodes.

In an example, the context-free grammar may include a first rule for an order category. A tree may be created for an order, where the tree when completed will include a sequence of text and an associated sequence of transcodes. The context-free grammar may have a rule that expands the order category into an add, update or split category. The context-free grammar may also have a rule that causes expansion to an optional greeting, one or more regular expressions, joins, and so on. The context-free grammar may also have one or more rules that expand objects to one or more optional request phrases, optional pauses, and so on. The context-free grammar may also have one or more rules that expand objects to one or more noun phrases and/or verb phrases. The context-free grammar may also have one or more rules that expand objects to one or more post modifiers.

In a simple context-free grammar, there is no relationship between noun phrases and/or verb phrases. Such a lack of relationship can lead to sentences that are unreasonable within a particular domain. Accordingly, in embodiments the context-free grammar may include rules that generate variables which are terminals of the context-free grammar. Each of the variables may map to one or more lists of entities, lists of properties, lists of phrases (e.g., post modifiers) and so on. For example, a variable of food entities may map to a list or table of food items from a menu. In another example, a variable of hamburger options may map to a list of options for hamburgers, and may only be generated by the context-free grammar if a previous terminal of food entries has resolved to a hamburger. The variables and associated lists or tables that are used by the conversational simulator may be specific to a particular domain for which the conversational simulator is generating synthetic sentences.

The conversational simulator 255 may select an entity (e.g., an entry) from an appropriate list associated with a variable in a generated tree. Once the variable is replaced with an entity, the information on the selected entity may be used to limit options for other expansions and/or leaves on the tree, thereby reducing the range of options for the later expansions or leaves to those that are reasonable in association with the selected entity. Thus, information may be passed up and down the tree as it is generated by the context-free grammar. Accordingly, once a particular entity is selected, the conversational simulator 255 can limit the further grammar that can be created for a sentence to those that are reasonable in the context of the selected entity.

Particular selections of particular options when multiple options are available at a particular branch of a tree generated by the context-free grammar (e.g., at a particular expansion) may be random or pseudorandom selections based on the output of a random number generator or pseudorandom number generator. Similarly, selection of options from a list associated with a variable may be a random or pseudorandom selection based on the output of a random number generator or pseudorandom number generator. Some entities may have multiple different properties associated with them. Once such an entity is selected, later leaves in the tree may comprise values of one or more of the properties associated with the entity. Some entities with one or more properties may have default options for some or all of the properties. Such default options may be associated with a particular probability weight that causes those default options to be selected more often than alternative options (e.g., a weight of 70%, 80%, 90%, and so on). For each of the properties, the conversational simulator 255 may determine whether the default option is selected or an alternate option is selected using a pseudorandom number generator and a probability weight associated with a default option of the property. If a default option is selected for a property, then no text or associated transcode may be added to the tree for that property.

The grapheme to phoneme converter 228 converts the text representation of synthetic sentences 265 of synthetic training data items 260 output by the conversational simulator 255 into sequences of phonemes 285. Accordingly, after using the grapheme to phoneme converter 228 on the initial synthetic training dataset 258, a modified synthetic training dataset 275 is generated that includes synthetic training data items 280 that include sequences of phonemes 285 and associated transcodes of the synthetic sentence 270.

The modified synthetic training dataset 275 may be input into the transcoder 120 for training. Additionally, or alternatively, the sequences of phonemes 285 from the synthetic training data items 280 of the modified synthetic training dataset 275 may be input into a phoneme distorter 288 prior to being input into the transcoder 120 for training. The phoneme distorter 228 may include a number of rules that perform operations such as inserting one or more additional phonemes to a sequence of phonemes 285, deleting one or more phonemes to a sequence of phonemes 285, and/or substituting one or more phonemes from the sequence of phonemes 285. In one embodiment, the phoneme distorter 288 includes a rules engine that randomly or pseudo-randomly applies one or more distortion rules. In one embodiment, the phoneme distorter 288 is a machine learning model (e.g., a neural network) trained to distort sequences of phonemes.

Alteration of the sequence of phonemes 285 may purposely make the sequence of phonemes less clear and/or understandable. The output of the phoneme distorter 288 may be a distorted synthetic training dataset 290 that includes a collection of synthetic training data items 292 with a distorted sequence of phonemes 294 and transcodes of the synthetic sentence 270 originally output by the conversational simulator 255. The distorted synthetic training dataset 290 may be input into the transcoder 120 during training along with or instead of the modified synthetic training dataset 275. In some embodiments, a text distorter (not shown) additionally or alternatively distorts the text representations of synthetic sentences 265 for one or more synthetic training data items 260 before they are input into the grapheme to phoneme converter 228.

Distortion of the phonemes in at least some of the training data causes the transcoder 120 to be trained to successfully determine transcodes even from noisy, distorted inputs of phonemes, making the transcoder 120 more robust to noise, accents, and so on.

FIGS. 3-6 are flow diagrams illustrating methods for training components of a conversational agent as well as methods of applying audio data to a trained conversational agent to determine speaker intent, in accordance with embodiments of the present disclosure. The methods may be performed by processing logic that comprises hardware (e.g., circuitry, dedicated logic, programmable logic, microcode, etc.), software (e.g., instructions run on a processor), firmware, or a combination thereof. The methods may be performed, for example, by a computing device such as computing device 700 executing a conversational agent pipeline 780, an AM training pipeline 782 and/or a transcoder training pipeline 784 of FIG. 7.

For simplicity of explanation, the methods are depicted and described as a series of acts. However, acts in accordance with this disclosure can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events.

Figure 3:
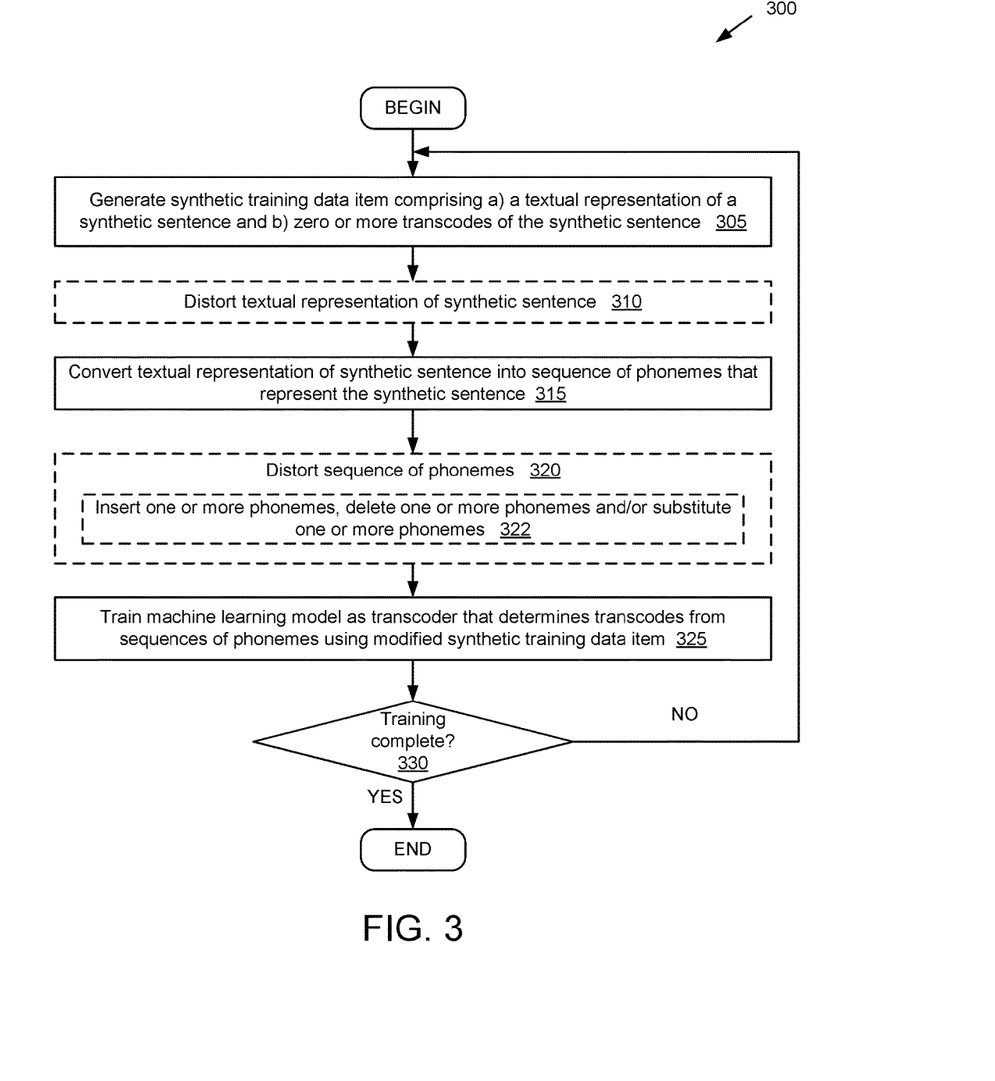
FIG. 3 is a flow diagram illustrating a method of training a machine learning model as a transcoder, in accordance with embodiments of the present disclosure.

FIG. 3 is a flow diagram illustrating a method 300 of training a machine learning model as a transcoder, in accordance with embodiments of the present disclosure. Method 300 may be performed, for example, using the transcoder training pipeline 250 of FIG. 2B in embodiments. At block 305, processing logic generates a synthetic training data item comprising a) a textual representation of a synthetic sentence (e.g., a sequence of text characters) and b) a corresponding sequence of transcodes of the synthetic sentence using conversational simulator 255. For example, the synthetic sentence may be, "can I please have a hamburger with no pickles, oh, and please add extra onions," and the sequence of transcodes may be, "[order], [hamburger], [remove], [pickles], [add], [onions]" or "[add hamburger], [no pickles], [add onions]."

At block 310, processing logic may distort the textual representation of the synthetic sentence. At block 315, processing logic converts the textual representation of the synthetic sentence into a sequence of phonemes that represent the synthetic sentence using graphene to phoneme converter 228. At block 320, processing logic may distort one or more phonemes in the sequence of phonemes. In one embodiment, at block 322 processing logic replaces one or more phonemes, deletes one or more phonemes and/or adds one or more phonemes.

At block 325, processing logic trains a machine learning model as a transcoder 120 that determines sequences of transcodes from sequences of phonemes using the modified synthetic training data that includes the sequence of phonemes and the sequence of transcodes. At block 320, processing logic determines whether training of the transcoder 120 is complete. Training may be complete if the transcoder has a target level of accuracy. If training is not complete, the method returns to block 305 and another synthetic training data item is generated. If training is complete, the method ends.

Figure 4:
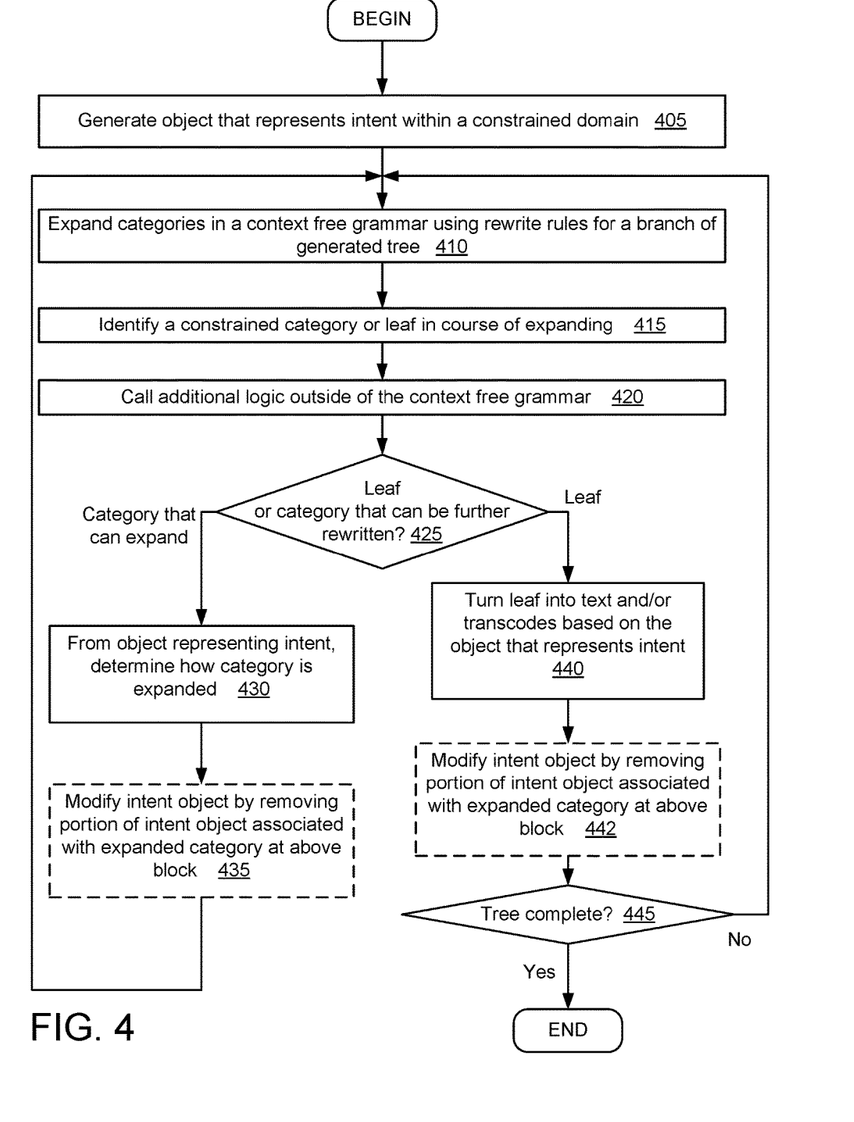
FIG. 4 is a flow diagram illustrating a method of generating synthetic speech data, in accordance with embodiments of the present disclosure.

FIG. 4 is a flow diagram illustrating a method 400 of generating synthetic speech data, in accordance with embodiments of the present disclosure. Method 400 may be performed by processing logic executing conversational simulator 255 in embodiments.

At block 405 of method 400, processing logic generates an intent object that represents an intent within a constrained domain. An example of an intent object is [cheeseburger, no onions, extra mayonnaise]. At block 410, processing logic uses a context free grammar to begin building a tree representing a synthetic sentence. The processing logic expands one or more categories in the context free grammar using rewrite rules for a branch of the tree.

At block 415, processing logic identifies a constrained category or leaf in the course of expanding. A block 420, processing logic calls additional logic (e.g., python logic) that is outside of the context free grammar.

At block 425, processing logic (e.g., the additional logic outside of the context free grammar) determines whether a constrained category or a leaf was identified at block 415. If a category that can be further expanded was identified, the method continues to block 430. If a leaf is identified, the method proceeds to block 440.

At block 430, processing logic determines how to expand the constrained category using the intent object. For example, if the intent object included "hamburger", then a noun may expand to "food item" or "hamburger". At block 435, processing logic may then modify the intent object by removing a portion of the intent object associated with the expanded category at block 430. For example, if the intent object was [hamburger, no onions, extra mayo], then the intent object may be updated to [no onions, extra mayo]. The method then returns to block 410.

At block 440, processing logic turns a leaf of the tree into text and/or a transcode based on the intent object. At block 442, processing logic may modify the intent object by removing a portion of the intent object associated with the text and/or transcode added at block 440.

At block 445, processing logic determines whether the tree is complete (meaning that the synthetic sentence and associated transcodes are complete). If the tree is complete, the method ends. Otherwise, the method returns to block 410.

Figure 5:
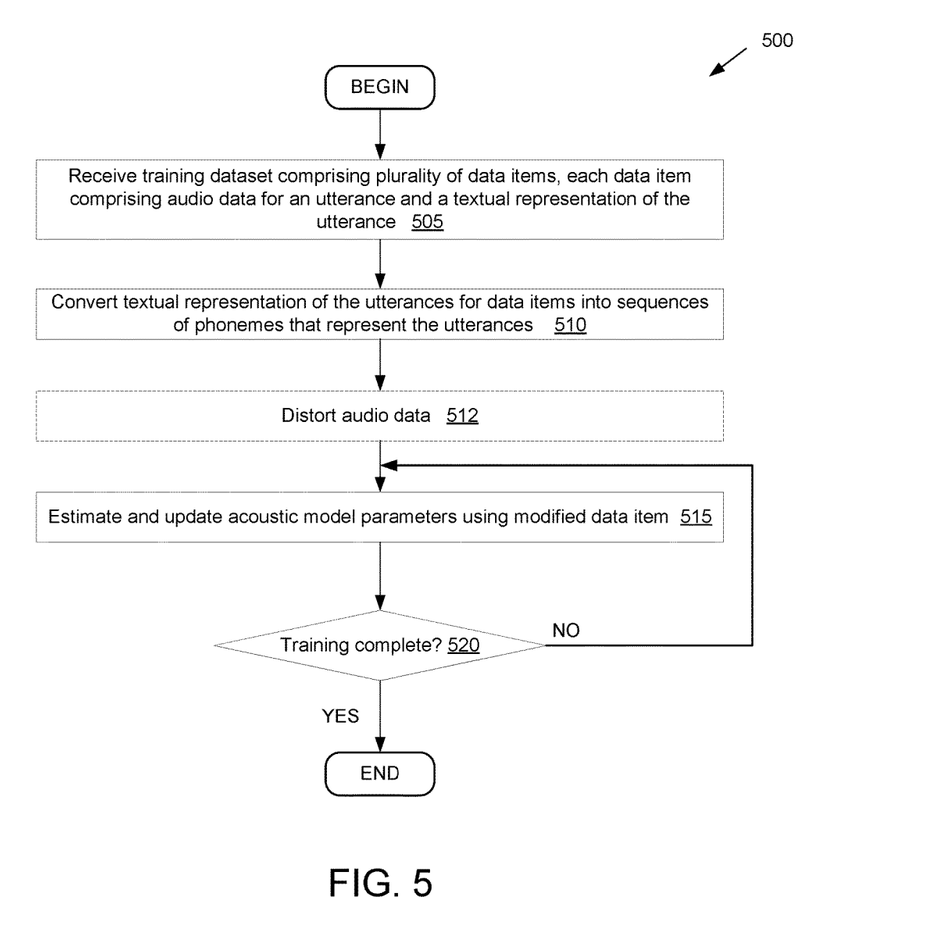
FIG. 5 is a flow diagram illustrating a method of training an acoustical model, in accordance with embodiments of the present disclosure.

FIG. 5 is a flow diagram illustrating a method 500 of training a machine learning model as an acoustical model, in accordance with embodiments of the present disclosure. Method 500 may be performed, for example, using the AM training pipeline 200 of FIG. 2A in embodiments. At block 505 of method 500, processing logic receives a training dataset comprising a plurality of data items. Each data item in the training dataset may include audio data (e.g., an audio waveform) for an utterance and a textual representation of the utterance.

At block 510, a grapheme to phoneme converter 228 converts the textual representation of the utterance (e.g., sequence of text words) for a data item into a sequence of phonemes that represent the utterance. At block 512, processing logic may distort the audio data, such as by adding background music, reverberation, background noise (e.g., airport noise, playground noise, classroom noise, road noise, etc.), and so on to the audio data. At block 515, processing logic trains a machine learning model using the modified data item. The acoustical model is trained to generate sequences of phonemes from acoustic features derived from raw audio data of utterances.

At block 515, processing logic determines whether training is complete. If training is complete, the method ends. If training is not complete, the method returns to block 510, and another training data item is processed.

Figure 6:
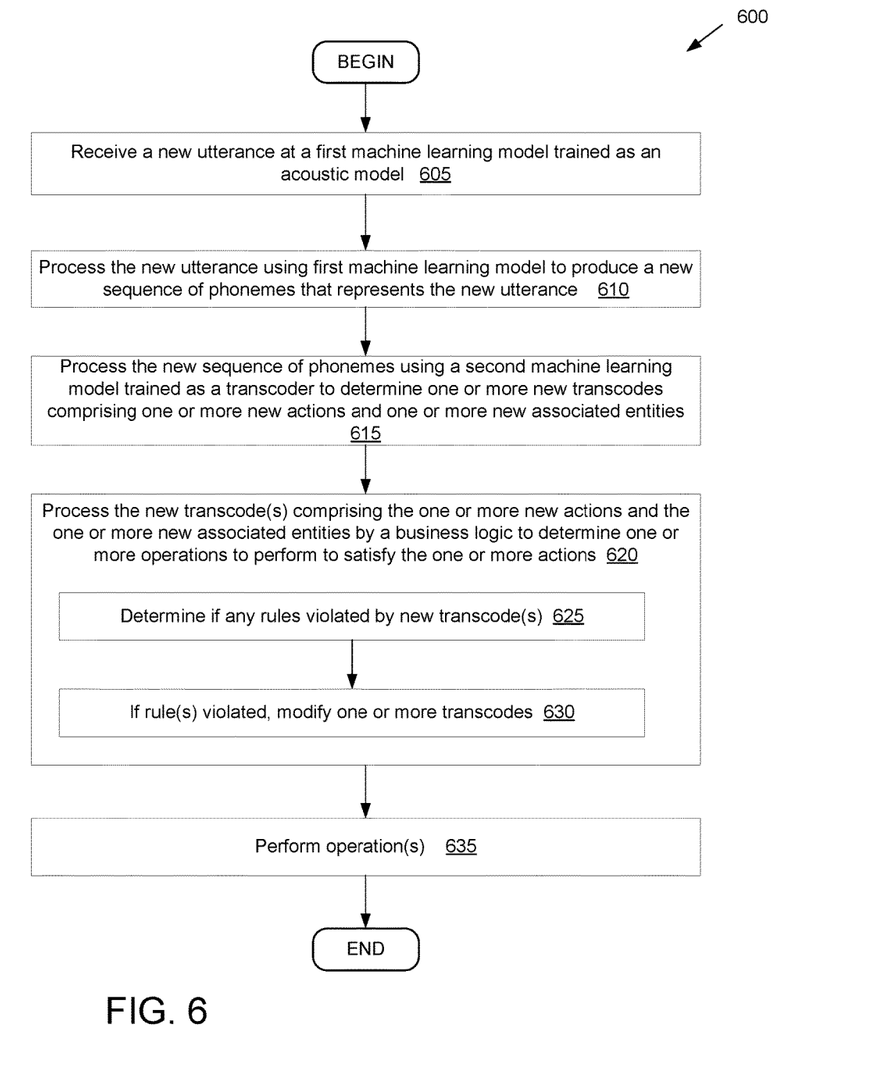
FIG. 6 is a flow diagram illustrating a method of determining a speaker's intent from audio input using a conversational agent, in accordance with embodiments of the present disclosure.

FIG. 6 is a flow diagram illustrating a method 600 of determining a speaker's intent from audio data using a conversational agent (e.g., conversational agent pipeline 100), in accordance with embodiments of the present disclosure. At block 605, processing logic receives a new utterance (e.g., an audio waveform of an utterance) at a first machine learning model trained as an acoustical model 110. At block 610, processing logic processes the new utterance using the first machine learning model to produce a new sequence of phonemes that represent the new utterance.

At block 615, processing logic processes the new sequence of phonemes using a second machine learning model trained as a transcoder 120 to determine one or more new transcodes comprising one or more new actions and one or more associated entities. At block 620, processing logic processes the new transcodes comprising the one or more new actions and the one or more new associated entities using a business logic 130 to determine or more operations to perform to satisfy the one or more actions. In one embodiment, the business logic determines if any rules are violated by the new transcodes at block 625. If any rules are violated, processing logic may modify one or more of the transcodes at block 630, such as by deleting one or more transcodes if there are duplicate transcodes. The business logic may also determine that a speaker intent is ambiguous from the transcodes and output an inquiry. At block 635, the business logic may perform the one or more determined operations to satisfy a speaker intent.

Figure 7:
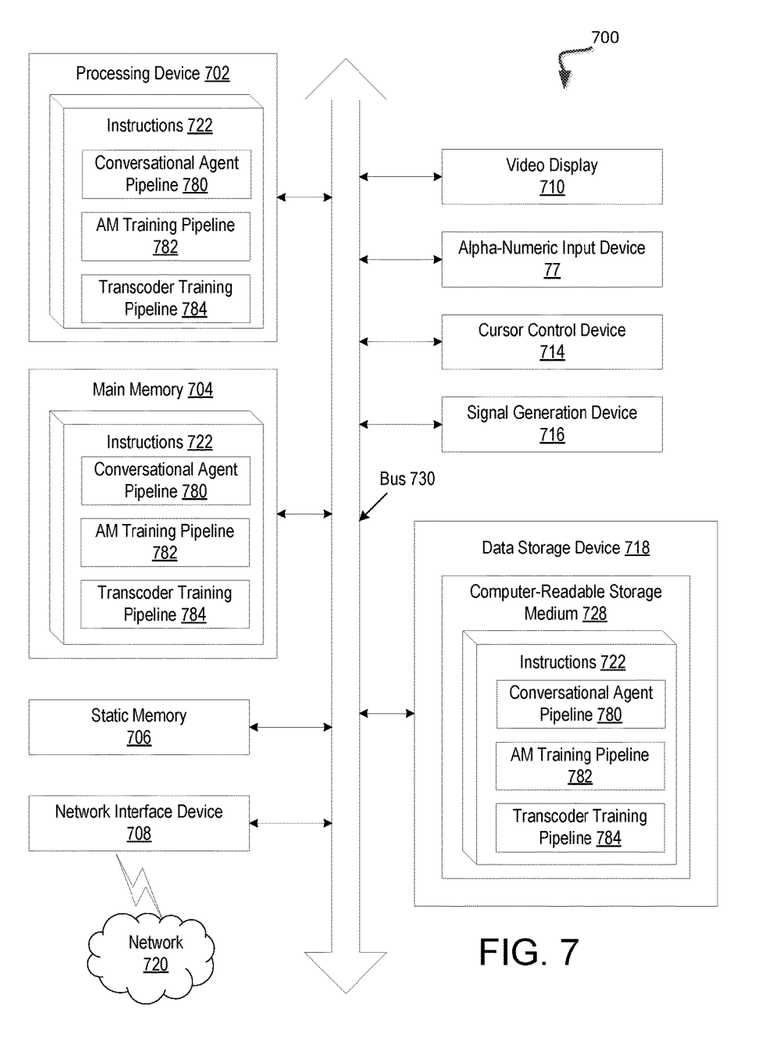
FIG. 7 is a block diagram illustrating an exemplary computer system, in accordance with embodiments of the present disclosure.

FIG. 7 illustrates a diagrammatic representation of a machine in the exemplary form of a computing device 700 within which a set of instructions, for causing the machine to perform any one or more of the methodologies discussed herein, may be executed. The computing device 700 may be in the form of a computing device within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server machine in client-server network environment. The machine may be a personal computer (PC), a set-top box (STB), a server computing device, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The computing device 700 includes a processing device (processor) 702, a main memory 704 (e.g., read-only memory (ROM), flash memory, dynamic random access memory (DRAM) such as synchronous DRAM (SDRAM)), a static memory 706 (e.g., flash memory, static random access memory (SRAM)), and a data storage device 718, which communicate with each other via a bus 730.

Processing device 702 represents one or more general-purpose processing devices such as a microprocessor, central processing unit, or the like. More particularly, the processing device 702 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processing device 702 may also be one or more special-purpose processing devices such as an application specific integrated circuit (ASIC), a field programmable gate array (FPGA), a digital signal processor (DSP), network processor, or the like.

The computing device 700 may further include a network interface device 708. The computing device 700 also may include a video display unit 710 (e.g., a liquid crystal display (LCD) or a cathode ray tube (CRT)), an alphanumeric input device 712 (e.g., a keyboard), a cursor control device 714 (e.g., a mouse), and a signal generation device 716 (e.g., a speaker).

The data storage device 718 may include a computer-readable medium 728 on which is stored one or more sets of instructions 722 (e.g., instructions of machine learning system 780) embodying any one or more of the methodologies or functions described herein. Conversational agent pipeline 780 may correspond to conversational agent pipeline 100 of FIG. 1 in embodiments. AM training pipeline 782 may correspond to AM training pipeline 200 of FIG. 2A in embodiments. Transcoder training pipeline 784 may correspond to transcoder training pipeline 250 of FIG. 2B in embodiments. The instructions 722 may also reside, completely or at least partially, within the main memory 704 and/or the processing device 702 during execution thereof by the computer system 700, the main memory 704 and the processing device 702 also constituting computer-readable media. Though a single computing device 700 is shown that includes conversational agent pipeline 780, AM training pipeline 782 and transcoder training pipeline 784, each of these pipelines may resides on separate computing devices. Additionally, each of the separate computing devices may be multiple computing devices that operate together (e.g., a cluster of computing devices) to implement one or more of the methodologies or functions described herein.

While the computer-readable storage medium 728 is shown in an exemplary embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any non-transitory medium that is capable of storing, encoding or carrying a set of instructions for execution by the machine and that cause the machine to perform any one or more of the methodologies described herein. The term "computer-readable storage medium" shall accordingly be taken to include, but not be limited to, solid-state memories, optical media, and magnetic media.

The preceding description sets forth numerous specific details such as examples of specific systems, components, methods, and so forth, in order to provide a good understanding of several embodiments of the present disclosure. It will be apparent to one skilled in the art, however, that at least some embodiments of the present disclosure may be practiced without these specific details. In other instances, well-known components or methods are not described in detail or are presented in simple block diagram format in order to avoid unnecessarily obscuring embodiments of the present disclosure. Thus, the specific details set forth are merely exemplary. Particular implementations may vary from these exemplary details and still be contemplated to be within the scope of the present disclosure.

In the above description, numerous details are set forth. It will be apparent, however, to one of ordinary skill in the art having the benefit of this disclosure, that embodiments of the disclosure may be practiced without these specific details. In some instances, well-known structures and devices are shown in block diagram form, rather than in detail, in order to avoid obscuring the description.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "generating", "converting", "training", "determining", "receiving", "processing", or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Embodiments of the disclosure also relate to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

It is to be understood that the above description is intended to be illustrative, and not restrictive. Many other embodiments will be apparent to those of skill in the art upon reading and understanding the above description. The scope of the disclosure should, therefore, be determined with reference to the appended claims, along with the full scope of equivalents to which such claims are entitled.

What is claimed is:

1. A method comprising:
generating a plurality of synthetic training data items, wherein a synthetic training data item of the plurality of synthetic training data items comprises a) a textual representation of a synthetic sentence and b) one or more transcodes of the synthetic sentence comprising one or more actions and one or more entities associated with the one or more actions included in the synthetic sentence;
for each synthetic training data item of the plurality of synthetic training data items, converting the textual representation of the synthetic sentence of the synthetic training data item into a sequence of phonemes that represent the synthetic sentence; and
training a first machine learning model as a transcoder that determines transcodes comprising actions and associated entities from sequences of phonemes, wherein the training is performed using a first training dataset comprising the plurality of synthetic training data items that comprise a) sequences phonemes that represent synthetic sentences and b) transcodes of the synthetic sentences.

2. The method of claim 1, further comprising:
receiving a second training dataset comprising a plurality of data items, wherein each data item of the plurality of data items comprises acoustic features derived from audio data for an utterance and a textual representation of the utterance;
for each data item of the plurality of data items, converting the textual representation of the utterance into a sequence of phonemes that represent the utterance; and
training a second machine learning model as an acoustic model that generates sequences of phonemes from acoustic features derived from audio data of utterances, wherein the training is performed using a modified second training dataset comprising a plurality of modified data items that comprise a) acoustic features of audio data for utterances and b) sequences of phonemes that represent the utterances.

3. The method of claim 2, further comprising:
receiving new acoustic features of a new utterance at the second machine learning model trained as the acoustic model;
processing the acoustic features of the new utterance using the second machine learning model to produce a new sequence of phonemes that represents the new utterance;
processing the new sequence of phonemes using the first machine learning model trained as the transcoder to determine one or more new transcodes comprising one or more new actions and one or more new associated entities;
processing the one or more new transcodes comprising the one or more new actions and the one or more new associated entities by a business logic to determine one or more operations to perform to satisfy the one or more actions; and
performing the one or more operations.

4. The method of claim 3, wherein the new sequence of phonemes produced by the second machine learning model comprises a posteriorgram comprising a sequence of vectors, wherein each vector in the sequence of vectors is a sparse vector comprising a plurality of values, wherein each value of the plurality of values represents a probability of a particular phoneme.

5. The method of claim 2, further comprising:
for one or more data items of the plurality of data items, distorting the audio data by adding at least one of background reverberation, background noise, or background music to the audio data, wherein the modified second training dataset comprises a first set of data items with undistorted audio data and a second set of data items with distorted audio data.

6. The method of claim 1, further comprising:
for one or more training data items of the plurality of training data items, performing at least one of a) distorting the textual representation of the synthetic sentence for the one or more training data items prior to converting the textual representation into the sequence of phonemes or b) distorting the sequence of phonemes after converting the textual representation into the sequence of phonemes.

7. The method of claim 6, wherein distorting the sequence of phonemes comprises performing at least one of a) substituting one or more phonemes in the sequence of phonemes, b) removing one or more phonemes in the sequence of phonemes, or c) inserting one or more phonemes to the sequence of phonemes.

8. The method of claim 1, wherein generating a synthetic training data item comprises:
generating an intent object that represents intent within a constrained domain;
expanding categories in a context-free-grammar using one or more rewrite rules; identifying a constrained category while performing the expanding; and
determining how to expand the constrained category from the intent object, wherein the constrained category is expanded to a particular entity.

9. The method of claim 8, further comprising:
modifying the intent object by removing the particular entity from the intent object.

10. The method of claim 1, wherein generating a synthetic training data item comprises:
generating an intent object that represents intent within a constrained domain;
expanding categories in a context-free-grammar using one or more rewrite rules;
identifying a leaf while performing the expanding; and
determining how to turn the leaf into at least one of text or one or more transcodes based on the intent object.

11. A system comprising:
one or more memory to store instructions; and
one or more processing device connected to the memory, the one or more processing device to execute the instructions to:
generate a plurality of synthetic training data items, wherein a synthetic training data item of the plurality of synthetic training data items comprises a) a textual representation of a synthetic sentence and b) one or more transcodes of the synthetic sentence comprising one or more actions and one or more entities associated with the one or more actions included in the synthetic sentence;
for each synthetic training data item of the plurality of synthetic training data items, convert the textual representation of the synthetic sentence of the synthetic training data item into a sequence of phonemes that represent the synthetic sentence; and
train a first machine learning model as a transcoder that determines transcodes comprising actions and associated entities from sequences of phonemes, wherein the training is performed using a first training dataset comprising the plurality of synthetic training data items that comprise a) sequences phonemes that represent synthetic sentences and b) transcodes of the synthetic sentences.

12. The system of claim 11, wherein the one or more processing devices are further to:
receive a second training dataset comprising a plurality of data items, wherein each data item of the plurality of data items comprises audio data for an utterance and a textual representation of the utterance;
for each data item of the plurality of data items, convert the textual representation of the utterance into a sequence of phonemes that represent the utterance; and
train a second machine learning model as an acoustic model that generates sequences of phonemes from audio data of utterances, wherein the training is performed using a modified second training dataset comprising a plurality of modified data items that comprise a) acoustic features of audio data for utterances and b) sequences of phonemes that represent the utterances.

13. The system of claim 12, wherein the one or more processing devices are further to:
for one or more data items of the plurality of data items, distort the audio data by adding at least one of background reverberation, background noise, or background music to the audio data, wherein the modified second training dataset comprises a first set of data items with undistorted audio data and a second set of data items with distorted audio data.

14. The system of claim 12, wherein the one or more processing devices are further to:
for one or more training data items of the plurality of training data items, perform at least one of a) distorting the textual representation of the synthetic sentence for the one or more training data items prior to converting the textual representation into the sequence of phonemes or b) distorting the sequence of phonemes after converting the textual representation into the sequence of phonemes.

15. The system of claim 11, wherein generating a synthetic training data item comprises:
generating an intent object that represents intent within a constrained domain;
expanding categories in a context-free-grammar using one or more rewrite rules;
initial representation of the synthetic sentence using a context-free grammar, wherein the initial representation comprises one or more variables;
identifying a constrained category while performing the expanding; and
determining how to expand the constrained category from the intent object, wherein the constrained category is expanded to a particular entity.

16. The system of claim 15, wherein the one or more processing devices are further to:
modify the intent object by removing the particular entity from the intent object.

17. The system of claim 11, wherein generating a synthetic training data item comprises:
generating an intent object that represents intent within a constrained domain;
expanding categories in a context-free-grammar using one or more rewrite rules;
identifying a leaf while performing the expanding; and
determining how to turn the leaf into at least one of text or one or more transcodes based on the intent object.

18. A method comprising:
receiving acoustic features of an utterance at a first machine learning model trained as an acoustic model based on a first training dataset comprising a plurality of data items that each comprise a) acoustic features of audio data for utterances and b) sequences of phonemes that represent the utterances;

outputting a first sequence of phonemes that represents the utterance by the first machine learning model;

processing the first sequence of phonemes using a second machine learning model trained as a transcoder based on a second training dataset comprising a plurality of synthetic training data items that comprise a) sequences phonemes that represent synthetic sentences and b) transcodes of the synthetic sentences;

outputting one or more transcodes comprising one or more actions and one or more associated entities by the second machine learning model;

processing the one or more transcodes comprising the one or more actions and the one or more associated entities by a business logic to determine one or more operations to perform to satisfy the one or more actions; and performing the one or more operations.

19. The method of claim 18, further comprising:

generating the second training dataset, the generating comprising:

generating a plurality of synthetic training data items, wherein a synthetic training data item of the plurality of synthetic training data items comprises a) a textual representation of a synthetic sentence and b) one or more transcodes of the synthetic sentence comprising one or more actions and one or more entities associated with the one or more actions included in the synthetic sentence; and for each synthetic training data item of the plurality of synthetic training data items, converting the textual representation of the synthetic sentence into a sequence of phonemes that represent the synthetic sentence; and training the second machine learning model as the transcoder using the second training dataset.

20. The method of claim 18, further comprising:

generating the first training dataset, the generating comprising:

receiving an initial second training dataset comprising a plurality of data items, wherein each data item of the plurality of data items comprises audio data for an utterance and a textual representation of the utterance; and for each data item of the plurality of data items, converting the textual representation of the utterance into a sequence of phonemes that represent the utterance; and training the first machine learning model as the acoustic model using the first training dataset.

* * * * *